(12) United States Patent
Raskin

(10) Patent No.: US 10,140,493 B1
(45) Date of Patent: Nov. 27, 2018

(54) METHOD AND APPARATUS FOR TAKING ACTION BASED ON CODED GRAPHICAL OBJECT IN VIDEO CONTENT

(71) Applicant: JANUS TECHNOLOGIES, INC., Half Moon Bay, CA (US)

(72) Inventor: Sofin Raskin, Los Altos, CA (US)

(73) Assignee: JANUS TECHNOLOGIES, INC., Sunnyvale, CA (US)

( * ) Notice: Subject to any disclaimer, the term of this patent is extended or adjusted under 35 U.S.C. 154(b) by 0 days.

(21) Appl. No.: 15/494,123

(22) Filed: Apr. 21, 2017

Related U.S. Application Data

(60) Provisional application No. 62/326,275, filed on Apr. 22, 2016.

(51) Int. Cl.
  *G06K 7/10* (2006.01)
  *G06K 19/06* (2006.01)

(52) U.S. Cl.
  CPC ...... *G06K 7/1095* (2013.01); *G06K 19/06112* (2013.01)

(58) Field of Classification Search
  CPC ........ G06K 7/10; G06K 7/1095; G06K 19/06; G06K 19/06112

USPC .................................. 235/375, 494; 726/22
See application file for complete search history.

(56) References Cited

U.S. PATENT DOCUMENTS

| | | | | |
|---|---|---|---|---|
| 8,464,343 | B1 * | 6/2013 | Cidambi | G06F 21/51 726/22 |
| 8,485,428 | B1 * | 7/2013 | Barker | H04L 63/1433 235/375 |
| 8,813,218 | B2 | 8/2014 | Wang et al. | |
| 9,215,250 | B2 | 12/2015 | Porten et al. | |
| 9,231,921 | B2 | 1/2016 | Raskin et al. | |
| 9,232,176 | B2 | 1/2016 | Porten et al. | |
| 9,538,209 | B1 * | 1/2017 | Kokenos | H04N 21/2353 |
| 2014/0248039 | A1 | 9/2014 | Porten et al. | |

* cited by examiner

*Primary Examiner* — Daniel Hess
(74) *Attorney, Agent, or Firm* — Foley & Lardner LLP

(57) ABSTRACT

In general, embodiments of the invention include methods and apparatuses for taking predetermined actions based on coded graphical objects in video content for display by a computer device. According to some aspects, the coded graphical object can include a barcode or QR code. According to additional aspects, the predetermined actions can include performing a monitoring function or automatically providing credentials to a web service.

7 Claims, 3 Drawing Sheets

METHOD AND APPARATUS FOR TAKING ACTION BASED ON CODED GRAPHICAL OBJECT IN VIDEO CONTENT

CROSS-REFERENCE TO RELATED APPLICATIONS

The present application claims priority to U.S. Provisional Patent Application No. 62/326,275, filed Apr. 22, 2016, the contents of which are incorporated herein by reference in their entirety.

FIELD OF THE INVENTION

The present invention relates generally to secure computing and more particularly to methods and apparatuses for taking actions based on coded graphical objects in video content for display by a computer device.

BACKGROUND OF THE INVENTION

Inventions such as those described in U.S. Pat. No. 8,813,218 and U.S. Patent Publ. No. 20140248039 have dramatically advanced the state of the art of secure computing. However, further opportunities for improvement in the state of the art remain.

SUMMARY OF THE INVENTION

In general, embodiments of the invention include methods and apparatuses for taking predetermined actions based on coded graphical objects in video content for display by a computer device. According to some aspects, the coded graphical object can include a barcode or QR code. According to additional aspects, the predetermined actions can include performing a monitoring function or automatically providing credentials to a web service.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for understanding the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to general aspects, embodiments of the invention enable providing security functionality and management based on preconfigured situations. Example embodiments of the invention include methods and apparatuses for taking predetermined actions based on coded graphical objects in video content for display by a computer device.

Figure 1:
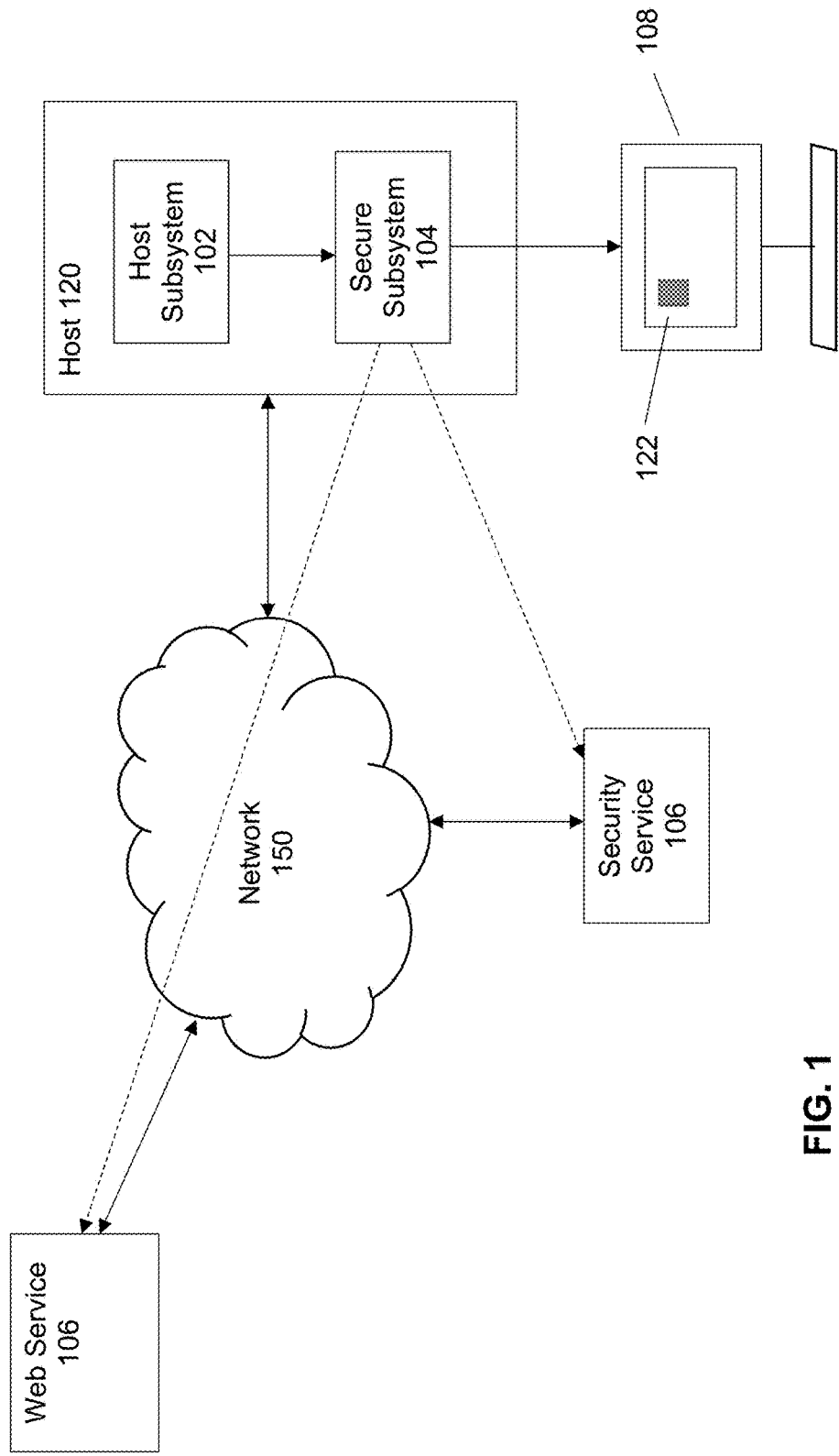
FIG. 1 is a block diagram illustrating an example aspects of an apparatus for detecting coded graphical objects in video streams and taking actions based thereon according to embodiments of the invention.

FIG. 1 is a block diagram illustrating example aspects of embodiments of the invention.

As shown, a host computer 120 accesses a web service 160 via network 150 and obtains content such as web pages and the like. Host subsystem 102 produces a video stream using the obtained content and causes it to be displayed on display 108. According to certain aspects of the invention, the content can include a graphical object 112. Secure subsystem 104 analyzes the video stream produced by host subsystem 102 to detect the graphical object 112.

In embodiments to be described in more detail below, graphical object 112 is a visible object such as a quick response (QR) code. However, the invention is not limited to this example and can include other types of visible or non-visible graphical objects such as one-dimensional barcodes, watermarks, etc.

Based on the detection of graphical object 112, secure subsystem 104 can take certain actions, as will be described in more detail below. Generally, however, as shown in the examples of FIG. 1, such actions can include notifying a security service 106. In this example, although shown separately from host computer 120, security service 106 and the user of host computer 120 can belong to the same organization and security service 106 can be part of the network administration for the organization. It should be noted that the notification provided by secure subsystem 104 to security service 106 need not be instantaneous. For example, the notification can be part of a regularly scheduled or on-demand report or it can be a report that is sent after a threshold number or types of events, etc.

In another example, actions taken by secure subsystem 104 can include automatically interacting with web service 160 separately from host subsystem 102. Such automatic interactions can include providing credentials, login information, etc. In these and other examples, web service 160 can include public or private email services (e.g. Gmail, Yahoo mail, private company email, etc.) and secure subsystem 104 can perform actions to login or gain access to an account provided by these email services.

Network 150 can include any combination of wired and wireless media and/or carriers, and can be implemented by various types and/or combinations of public (i.e. Internet) and private local or wide area networks using proprietary protocols running on top of conventional protocols such as HTTP, UDP and/or TCP.

In one non-limiting example configuration according to embodiments of the invention, host computers 120 are standalone computer systems, similar to conventional desktop, laptop or pad computers. In such an example, host subsystem 102 is implemented by a CPU (e.g. x86), a conventional operating system such as Windows and associated device driver software. According to aspects of the invention, host subsystem 102 includes a video subsystem (e.g. graphics controllers and associated drivers) and other subsystems. The other subsystems can include storage subsystems (e.g. SATA, SAS, etc.), I/O subsystems (e.g. USB, Firewire, etc.) and networking subsystems (e.g. Ethernet, network access devices such as wired or wireless modems, network interfaces, wireless transceivers, etc. and associated software (e.g. browsers, etc.)). Host subsystem 102 can further include interfaces such as an interface to expansion buses such as a Peripheral Component Interconnect (PCI) bus or a PCI Express (PCIe) bus. Further details of such other subsystems and interfaces will be omitted here for sake of clarity of the invention.

Depending on the form factor of host computer 120, display 108 can be a standalone monitor (e.g. flat screen, etc.), a built-in display or touch screen, a projection system, etc.

In these and other embodiments, secure subsystem 104 is preferably an embedded system. As such, it runs a designated software system furnished together with an embedded processor, and the software cannot be modified by the end-user of the computer system 120 under any circumstances. According to aspects of the present invention, subsystem 104 is responsible for performing security functions such as analyzing video data streams produced by host subsystem 102, and taking action upon detection of objects 112 in the video streams as will be described in more detail below. Those skilled in the art will understand how to implement these functionalities in an embedded system after being taught by the descriptions below.

In accordance with certain aspects of the invention, in this example, the operation and functionality of secure subsystem 104 is completely transparent to the host subsystem 102 and associated operating system and application software executed by subsystem 102. Moreover, the operating experience of host computer 120 by a user is identical to the experience of a conventional desktop, laptop or pad computer, apart from the graphical object detection functionality of the present invention. So while the application software that can run on the computer is virtually unrestricted, the contents of video streams output by computer 120 are controlled, stored and analyzed by subsystem 104 which takes appropriate actions as will be described in more detail below.

An example architecture for implementing secure subsystem 104 together with host subsystem 102 in a host computer 120 according to example embodiments of the invention is described in U.S. Pat. No. 9,231,921, the contents of which are incorporated by reference herein in their entirety. However, the invention is not limited to that example architecture and those skilled in the art will understand how to implement the principles of the present invention in various configurations of host computer 120 after being taught by the present disclosure.

Although aspects of the invention will be described in more detail herein in connection with an example implementation of host computer 120 as a standalone desktop or laptop PC, the invention is not limited to this example implementation. Rather, secure computer 120 can be an enterprise or industrial PC, point of sale PC, thin client, media player, smart phone or any appliance or computer device that requires advanced levels of data security, integrity and collaboration.

According to general aspects, in embodiments of the invention, security service 106 is responsible for managing policies that can include lists of actions to take based on corresponding objects 112. In embodiments, security service 106 sends these lists to secure subsystem 104 via network 106. Various aspects of a remote management system and/or security policies that can be adapted for use in the present invention are described in more detail in U.S. Pat. No. 9,215,250, the contents of which are incorporated herein by reference in their entirety.

Figure 2:
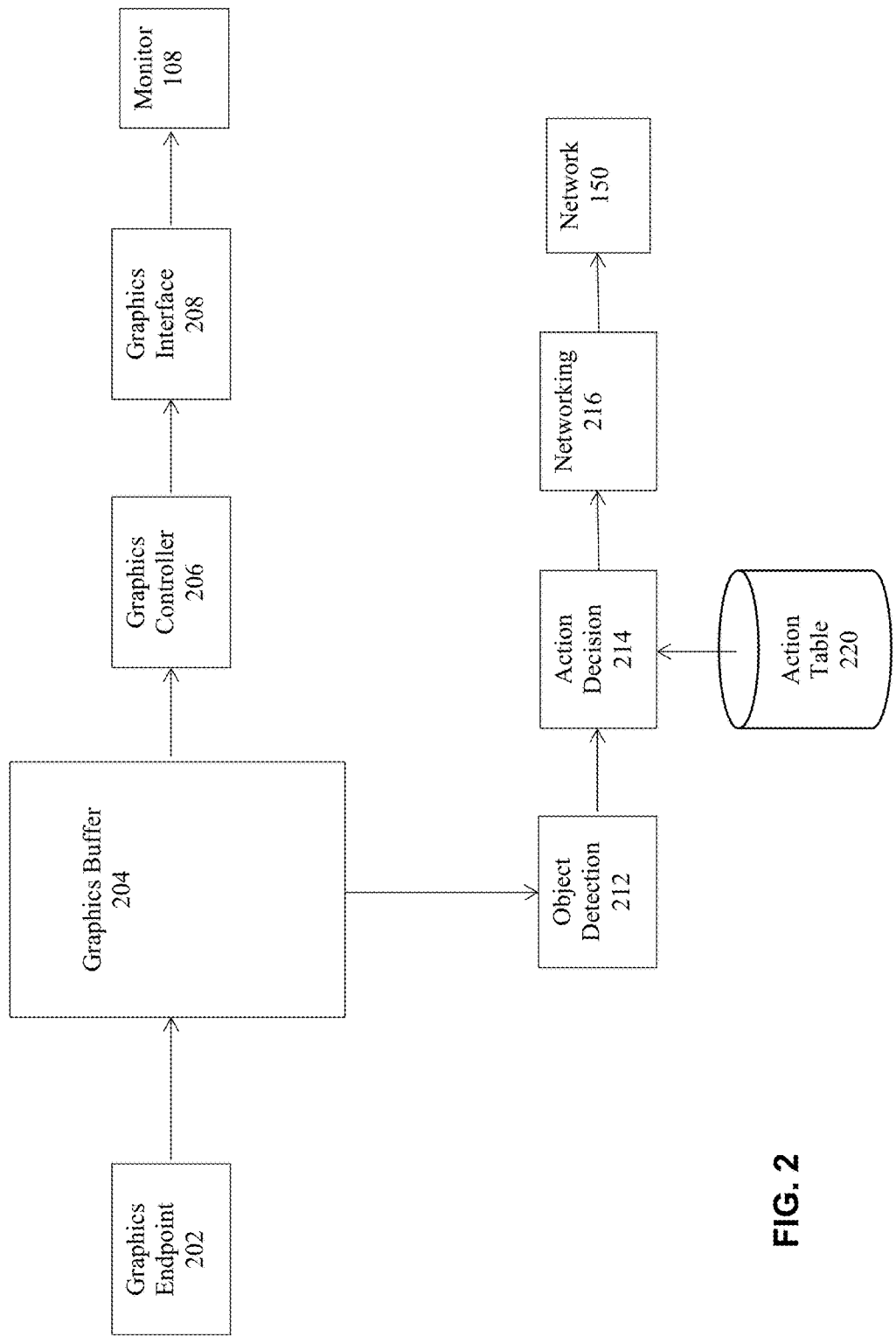
FIG. 2 is a block diagram illustrating an example secure video subsystem that can be included in the apparatus of FIG. 1 according to embodiments of the invention.

A block diagram showing an example video subsystem 200 for detecting and acting upon graphical objects in computer system video streams that can be included in secure subsystem 104 according to embodiments of the invention is shown in FIG. 2.

As shown in the example of FIG. 2, in embodiments, subsystem 200 includes a graphics endpoint 202 for receiving video streams generated by the host processor system 102 (e.g. operating system and application displays such as web pages rendered by a browser application). In example embodiments, graphics endpoint 202 is a PCIe endpoint that presents itself to host subsystem 102 as a PCIe connected graphics adapter. In this example embodiment, host subsystem 102 includes a PCIe expansion bus and subsystem 104 is incorporated on a PCIe card that is inserted in a slot of the host subsystem 102's PCIe bus. However, the invention is not limited to this example implementation.

Also in this example implementation, host subsystem 102 includes a conventional graphics driver application that manages and/or controls the display of image data using an associated PCIe connected graphics adapter having a frame buffer 204. The image data generated by host subsystem 102 can include text, graphics, still pictures, animated graphics, video, user interface elements (e.g. windows, cursors, etc.), etc. This data can be formatted in accordance with a proprietary or commercial graphics/video display standard (e.g. SVGA, XGA, HDTV, etc.) for storage in frame buffer 204, and refreshed as required by the appropriate display standard, if necessary. Those skilled in the art will appreciate that image data can comprise an array of pixel values corresponding to pixels on a display, for example 1024×768 pixels, and can include a number of bits per pixel to define a color value for the pixel. Those skilled in the art will further appreciate that the image data is typically refreshed at a rate (i.e. frame rate) corresponding to the refresh rate of an attached display, for example at 60 Hz. However, further details thereof will be omitted here for sake of clarity of the invention.

Graphics endpoint 202 receives the image data provided by host subsystem 102 and stores it in frame buffer 204. It should be noted that graphics endpoint 202 or host subsystem 102 can include DMA or other data transfer functionality for managing the transfer of the image data. Display controller 206 causes the image data to be provided to monitor 108 via an associated graphics interface 208 (e.g. an HDMI interface). Display controller 206 can be based on any commercial or proprietary display controller for driving and/or managing the display of content on a display, such as a conventional LCD or other flat panel display, and perhaps in accordance with a display standard such as SVGA, XGA, HDTV, etc., and further details thereof will be omitted here for sake of clarity of the invention.

According to aspects of the invention mentioned above, in addition to displaying the image data produced by host subsystem 102 in a conventional fashion as described above, video subsystem 200 includes functionality for detecting and taking action upon detected graphical objects in the image data.

In accordance with these and other aspects, as shown in this example, subsystem 200 further includes object detection block 212 coupled to the frame buffer 204. As set forth above, the data in frame buffer 204 can be formatted in accordance with a proprietary or commercial graphics/video display standard (e.g. SVGA, XGA, HDTV, etc.), and can comprise an array of pixel values with a number of bits per pixel to define a color value for the pixel. Object detection block 212 has knowledge of the format of data in frame buffer 204, and can use well-known pattern recognition techniques to detect a pattern of adjacent pixels that correspond to a predetermined object such as object 112 (e.g. a QR code) that is in the process of being displayed on monitor 108.

Object detection block 212 passes information about detected objects 112 to action decision block 214. In example embodiments where object 112 is a QR code, action decision block 214 decodes the data in the detected object using well-known techniques based on well-known predefined QR encoding standards. Using the decoded data, decision block 214 looks up an appropriate action to take in action table 220. It should be noted that, in other embodiments, the decoding of the QR code data can be performed by object detection block 212 instead of action decision block 214, and the decoded data can be provided by block 212 to action decision block 214.

In the event the action includes communicating via network 150 (e.g. to security service 106 or web service 160), action decision block interacts with network interface 216 to perform the action.

It should be noted that the video subsystem 200 illustrated in FIG. 2 can include some or all of the additional secure video functionalities described in U.S. Pat. No. 9,232,176, the contents of which are incorporated by reference herein in their entirety.

Figure 3:
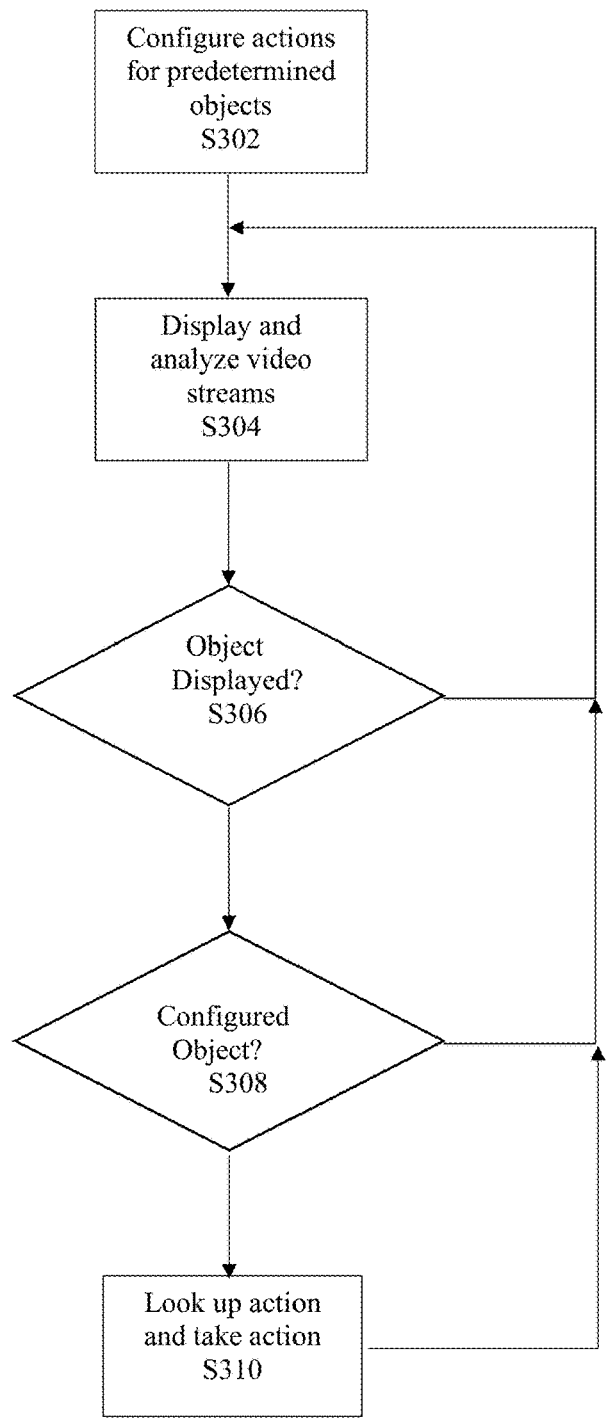
FIG. 3 is a flowchart illustrating an example method for taking actions based on detection of coded graphical objects in video streams according to embodiments of the invention.

FIG. 3 is a flowchart illustrating an example methodology for taking actions based on detected graphical objects in a video stream according to embodiments of the invention.

As shown in FIG. 3, a first step S302 includes configuring a computer device for taking actions based on detected graphical objects. For example, secure subsystem 104 can communicate with security service 106 to populate or update action table 220. This can include providing information regarding specific graphical objects (e.g. the decoded data in predetermined QR codes) and the actions to take when those specific graphical objects are detected in video streams to be displayed by the host computer 120.

In a next step S304, while the host computer 120 is being operated by a user, for example while the user is accessing the Internet using a browser application, video subsystem 200 operates to display video streams for the computer device, while simultaneously analyzing the video streams to detect configured graphical objects. According to aspects of the invention, this analysis is performed transparently to the user of the computer device, and the display of video streams (e.g. display of web pages) is otherwise performed in a conventional fashion.

In a next step S306, it is determined whether a video stream contains a graphical object of a predetermined type (e.g. QR code) by using well-known pattern recognition techniques as described above). If so, processing advances to step S308 to determine whether the graphical object is one of the objects configured in action table 220 (e.g. after decoding the data in the QR code using well-known techniques as described above). If so, processing further advances to step S310, where the action configured for that specific graphical object is determined. As set forth above, this can include looking up the configured action in action table 220. Finally in step S312, the configured action is taken, and processing returns to step S304 and analysis of video streams to detect specific graphical objects is resumed.

As indicated in the flowchart, the actions in one or more of steps S306 to S310 can be performed repeatedly while the computer is being operated, for example every time the frame buffer is refreshed or the objects being displayed are changed.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for taking a predetermined action based on a coded graphical object in video content for display by a computer device, comprising:
   generating, by a host subsystem of the computer device, the video content;
   receiving, by a secure subsystem of the computer device that is separate from the host subsystem, the video content over a bus of the computer device; and
   determining, by the secure subsystem and transparently to the host subsystem, whether the coded graphical object is present in the video content,
   wherein receiving includes the secure subsystem presenting itself as a graphics endpoint to the host subsystem, and
   wherein the graphics endpoint comprises a PCIe connected graphics adapter.

2. A method according to claim 1, wherein the coded graphical object is a barcode.

3. A method according to claim 1, wherein the coded graphical object is a QR code.

4. A method according to claim 1, wherein the predetermined action includes performing a monitoring function.

5. A method according to claim 1, wherein the predetermined action includes automatically providing credentials to a web service.

6. A method according to claim 1, wherein determining includes:
   storing the video content in a frame buffer of the secure subsystem;
   causing the video content to be displayed on a display device from the frame buffer; and
   performing a pattern recognition technique on data in the frame buffer to detect the coded graphical object.

7. A method according to claim 1, wherein determining includes:
   detecting a first graphical object in the video content;
   comparing the first graphical object to a predetermined type of graphical object; and if the first graphical object is the predetermined type of graphical object, identifying the coded graphical object in an action table.

\* \* \* \* \*